(12) United States Patent
Mitchell (10) Patent No.: US 7,593,860 B2
(45) Date of Patent: Sep. 22, 2009

(54) CAREER ANALYSIS METHOD AND SYSTEM

(75) Inventor: Peter James Mitchell, Woodstock, GA (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 11/224,519

(22) Filed: Sep. 12, 2005

(65) Prior Publication Data

US 2007/0059671 A1    Mar. 15, 2007

(51) Int. Cl.
    *G06F 9/46* (2006.01)
(52) U.S. Cl. ............... 705/8; 705/9; 705/10; 705/11; 434/219
(58) Field of Classification Search ............ 705/1, 705/9, 11; 434/219, 350
    See application file for complete search history.

(56) References Cited

U.S. PATENT DOCUMENTS

| | | | |
|---|---|---|---|
| 5,164,897 A * | 11/1992 | Clark et al. ................. | 705/1 |
| 5,416,694 A * | 5/1995 | Parrish et al. ............... | 705/8 |
| 6,275,812 B1 | 8/2001 | Haq et al. | |
| 6,289,340 B1 * | 9/2001 | Puram et al. ................ | 707/5 |
| 6,735,570 B1 * | 5/2004 | Lacy et al. .................. | 705/7 |
| 6,873,964 B1 * | 3/2005 | Williams et al. ............. | 705/9 |
| 6,996,366 B2 * | 2/2006 | L'Allier et al. ............. | 434/362 |
| 7,191,139 B2 * | 3/2007 | Roy et al. ................... | 705/1 |
| 7,249,145 B1 * | 7/2007 | Rock et al. .................. | 707/104.1 |
| 2001/0034011 A1 * | 10/2001 | Bouchard ................... | 434/236 |
| 2001/0042000 A1 * | 11/2001 | Defoor, Jr. .................. | 705/9 |
| 2002/0013735 A1 * | 1/2002 | Arora et al. ................. | 705/26 |
| 2002/0032638 A1 * | 3/2002 | Arora et al. ................. | 705/37 |
| 2002/0046199 A1 * | 4/2002 | Scarborough et al. ........ | 706/21 |
| 2002/0055870 A1 * | 5/2002 | Thomas ..................... | 705/10 |
| 2002/0059228 A1 * | 5/2002 | McCall et al. ............... | 707/6 |
| 2002/0091699 A1 | 7/2002 | Norton et al. | |
| 2002/0198766 A1 * | 12/2002 | Magrino et al. ............. | 705/11 |
| 2003/0093322 A1 * | 5/2003 | Sciuk ......................... | 705/26 |
| 2003/0105642 A1 * | 6/2003 | Andino et al. ............... | 705/1 |
| 2003/0129575 A1 * | 7/2003 | L'Allier et al. ............. | 434/362 |
| 2003/0182178 A1 | 9/2003 | D'Elena et al. | |
| 2003/0187723 A1 | 10/2003 | Hadden et al. | |
| 2003/0195786 A1 * | 10/2003 | Dewar ........................ | 705/8 |
| 2003/0225652 A1 * | 12/2003 | Minow et al. ............... | 705/36 |
| 2005/0080657 A1 | 4/2005 | Crow et al. | |
| 2005/0222899 A1 * | 10/2005 | Varadarajan et al. ........ | 705/11 |
| 2005/0267934 A1 * | 12/2005 | Brown et al. ............... | 709/203 |

(Continued)

*Primary Examiner*—Cameron Saadat
*Assistant Examiner*—Bruk A Gebremichael
(74) *Attorney, Agent, or Firm*—Schmeiser, Olsen & Watts; William E. Schiesser (57) ABSTRACT

A career analysis method and system. The system comprises a computing apparatus comprising data. The data comprises a specified job title and a first list comprising a first plurality of required skills for the specified job title. Candidate data is received by the computing apparatus. Candidate data comprises a job candidate and a second list comprising plurality of skills related to a job held by the candidate. The first plurality of required skills is compared with the plurality of skills related to the job held by the candidate to determine a set of common skills. A common skills score is calculated. A first set of market valued skills from the first plurality of required skills is determined. A score is calculated based on a function of the first set of market valued skills and the first plurality of required skills.

40 Claims, 3 Drawing Sheets

U.S. PATENT DOCUMENTS

2006/0015393 A1* 1/2006 Eisma et al. .................. 705/11
2006/0229896 A1* 10/2006 Rosen et al. .................. 705/1
2006/0229999 A1* 10/2006 Dodell et al. ................. 705/80
2007/0143167 A1* 6/2007 Cohen .......................... 705/9

* cited by examiner

CAREER ANALYSIS METHOD AND SYSTEM

TECHNICAL FIELD

The present invention relates to a system and associated method for performing a career analysis for a candidate.

BACKGROUND OF THE INVENTION

Selecting a suitable individual for performing a function typically requires a series of steps that may be complicated and inaccurate. Therefore there exists a need for a simple accurate means for selecting a suitable individual to perform a function.

SUMMARY OF THE INVENTION

The present invention provides a method, comprising:

providing a computing apparatus comprising a memory device, said memory device comprising a career analysis tool and job related data, said job related data comprising a first specified job title and a first list comprising a first plurality of required skills for said first specified job title;

receiving by said computing apparatus, job candidate data, said job candidate data comprising a job candidate and a second list comprising a second plurality of required skills related to a job held by said job candidate;

receiving, by said computing apparatus, job market data;

storing within said memory device, said job candidate data and said job market data;

comparing by said career analysis tool, said first plurality of required skills with said second plurality of required skills to determine a first set of common skills between said first plurality of required skills and said second plurality of skills;

calculating, by said career analysis tool, a first score for said candidate by dividing the number of said first set of common skills by the number of said first plurality of required skills;

comparing by said career analysis tool, said job market data with said first plurality of required skills to determine a first set of market valued skills from said first plurality of required skills; and calculating by said career analysis tool, a second score for said job candidate by dividing the number of said first set of market valued skills by the number of said first plurality of required skills.

The present invention provides a computing system comprising a processor coupled to a computer-readable memory unit, said memory unit comprising a career analysis tool and job related data, said job related data comprising a first specified job title and a first list comprising a first plurality of required skills for said first specified job title, said career analysis tool comprising instructions that when executed by the processor implement an analysis method, said method comprising:

receiving by said computing system, job candidate data, said job candidate data comprising a job candidate and a second list comprising a second plurality of required skills related to a job held by said job candidate;

receiving, by said computing system, job market data;

storing within said computer-readable memory unit, said job candidate data and said job market data;

comparing by said career analysis tool, said first plurality of required skills with said second plurality of required skills to determine a first set of common skills between said first plurality of required skills and said second plurality of skills;

calculating, by said career analysis tool, a first score for said candidate by dividing the number of said first set of common skills by the number of said first plurality of required skills;

comparing by said career analysis tool, said job market data with said first plurality of required skills to determine a first set of market valued skills from said first plurality of required skills; and calculating by said career analysis tool, a second score for said job candidate by dividing the number of said first set of market valued skills by the number of said first plurality of required skills.

The present invention provides a computer program product, comprising a computer usable medium comprising job related data and a computer readable program code embodied therein, said job related data comprising a first specified job title and a first list comprising a first plurality of required skills for said first specified job title, said computer readable program code comprising a career analysis tool adapted to implement an analysis method, said method comprising:

receiving job candidate data, said job candidate data comprising a job candidate and a second list comprising a second plurality of required skills related to a job held by said job candidate;

receiving job market data;

storing within said computer usable medium, said job candidate data and said job market data;

comparing by said career analysis tool, said first plurality of required skills with said second plurality of required skills to determine a first set of common skills between said first plurality of required skills and said second plurality of skills;

calculating, by said career analysis tool, a first score for said candidate by dividing the number of said first set of common skills by the number of said first plurality of required skills;

comparing by said career analysis tool, said job market data with said first plurality of required skills to determine a first set of market valued skills from said first plurality of required skills; and calculating by said career analysis tool, a second score for said job candidate by dividing the number of said first set of market valued skills by the number of said first plurality of required skills.

The present invention provides a process for integrating computing infrastructure, comprising integrating computer-readable code into a computer system, wherein the computer system comprises a computer usable medium, wherein said computer usable medium comprises job related data, wherein said job related data comprises a first specified job title and a first list comprising a first plurality of required skills for said first specified job title, and wherein the code in combination with the computer system is capable of performing a method comprising:

receiving by said computing system, job candidate data, said job candidate data comprising a job candidate and a second list comprising a second plurality of required skills related to a job held by said job candidate;

receiving by said computing system, job market data;

storing within said computer usable medium, said job candidate data and said job market data;

comparing, said first plurality of required skills with said second plurality of required skills to determine a first set of common skills between said first plurality of required skills and said second plurality of skills;

calculating a first score for said candidate by dividing the number of said first set of common skills by the number of said first plurality of required skills;

comparing, said job market data with said first plurality of required skills to determine a first set of market valued skills from said first plurality of required skills; and calculating, a second score for said job candidate by dividing the number of said first set of market valued skills by the number of said first plurality of required skills.

The present invention advantageously provides a simple accurate means for selecting a suitable individual to perform a function.

BEST MODE FOR CARRYING OUT THE INVENTION

Figure 1:
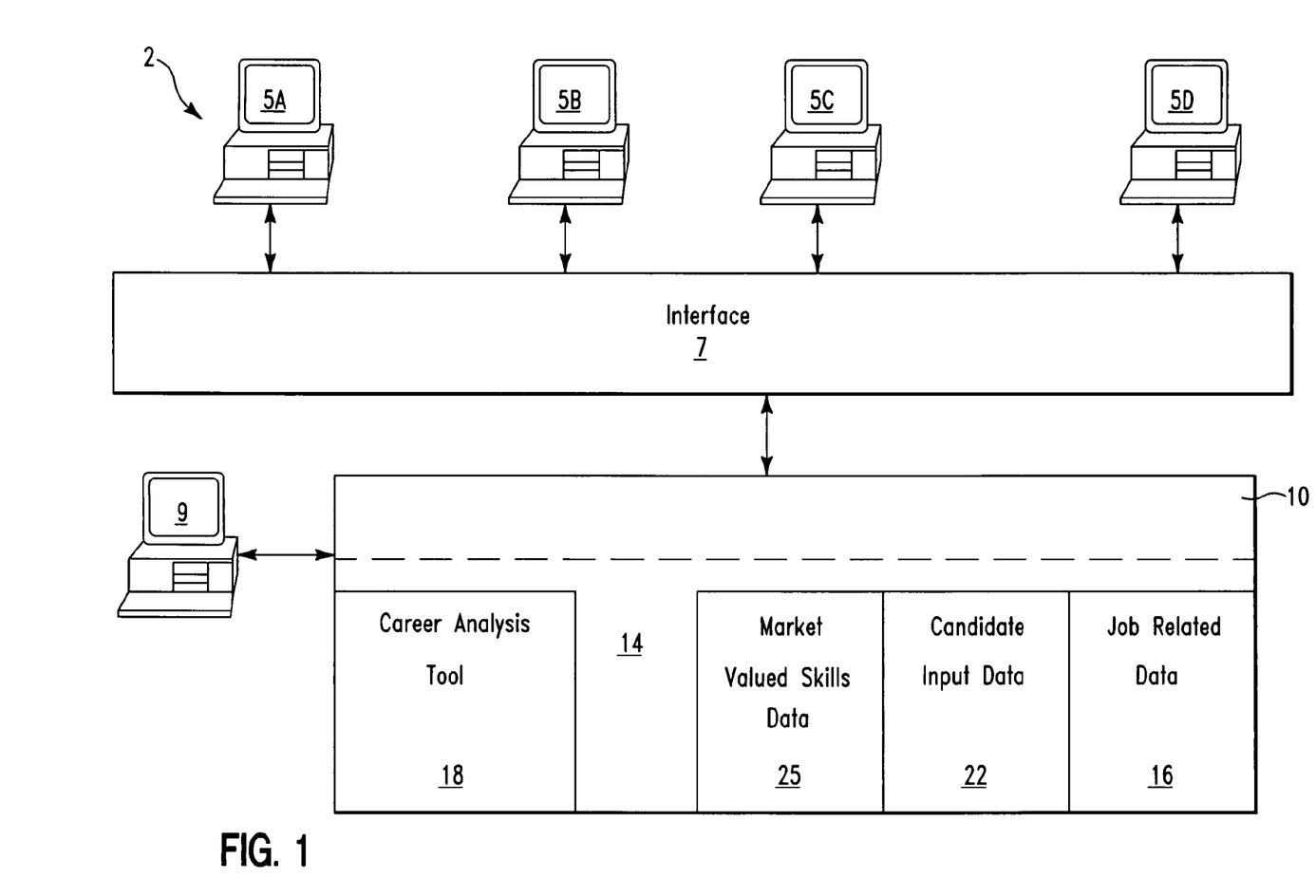
FIG. 1 illustrates a block diagram of an analysis system for determining suitable jobs for various candidates based on data related to job skills, in accordance with embodiments of the present invention.

FIG. 1 illustrates a block diagram of an analysis system 2 for determining suitable jobs for various candidates based on data related to job skills, in accordance with embodiments of the present invention. System 2 comprises a plurality of input terminals 5A . . . 5D connected to a computing apparatus 10 through an interface 7. Interface 7 may comprise any type of interface known to a person of ordinary skill in the art including, inter alia, a local area network, (LAN), a wide area network (WAN), the Internet, etc. Computing apparatus 10 may comprise any type of computing apparatus including, inter alia, a personal computer (PC), a server computer, etc. Additionally, system 2 comprises an administrator computer 9 connected to computing apparatus 10. Computing apparatus 10 comprises a memory apparatus 14. Memory apparatus 14 comprises a career analysis tool 18, job related data 16, candidate input data 22, and market valued skills data 25 related to job related data 16. Job related data 16 and market valued skills data 25 may be inputted into computing apparatus through administrator computer 9. Candidate input data 22 may be inputted into computing apparatus 10 through any of input terminals 5A . . . 5D. Job related data 16 comprises a list of specified job titles (e.g., computer programmers, data architect, network architects, etc) and associated required skills necessary to perform each specified job title. Candidate input data 22 comprises a list of candidates (e.g., job applicants) for the specified job titles from job related data 16. Additionally, candidate input data 22 comprises lists of required job skills related to a currently held position (i.e., job) by each candidate. Market valued skills data 25 comprises data for determining which of the associated required skills from job related data 16 comprises a market valued skill. A market valued skill is defined herein as a critical "hot" market place skill that is required to perform specified job and linked with business unit skills aligned to the achievement of business priorities (e.g., growth in revenue and innovation). A market valued skill comprises a job related skill that when applied to a job will produce significant revenue, drive significant innovation, and is aligned with a market direction and particular business strategy for an entity or business. Market valued skills are dynamic and change as new products and services are introduced into the market place (e.g., as technology changes at a rapid pace market valued skills also change at a rapid pace). Therefore, "hot" job related skills may become "cold" in a short period of time (e.g., a few months). Career analysis tool 18 in system 2 allows for a periodic (e.g., bi-annually) review and update of the market valued skills from market valued skills data 25. Therefore entities may stay on top of which job related skills are in demand (i.e., comprise market valued skills). External and internal market related data may be used to determine and update which job related skills comprise market valued skills. External market related data which identifies market valued skills may comprise any market related data known to a person of ordinary skill in the art including, inter alia, the Foote report, the Gartner group report, internet market data sources, etc. As a first example, the Foote report publishes a series of research products that comprises quarterly reports on "hot" trends/skills in the marketplace. The quarterly reports are developed via a continuous monitoring of compensation, attitudes, and workplace experiences of IT (Internet technology) workers in the U.S., Canada, UK and Europe. As a second example, the Gartner group report comprises research and analysis about the global information technology industry. Internal market related data may comprise any market related data known to a person of ordinary skill in the art including, inter alia, resource and capacity planning data for an entity, workforce management data for an entity such as attrition and demand growth in specific environment areas (products/services/offerings), etc. Career analysis tool 18 comprises software.

Career analysis tool 18 in system 2 of FIG. 1 allows job related data 16 to be compared to candidate input data 22 and a weighting factor(s) may be applied to the comparison to analyze a candidate's qualifications for specified job titles applied for by the candidate. Additionally, career analysis tool 18 in system 2 may be used to determine alternative job titles for the candidate other than those applied for by the candidate. The following example for implementation of career analysis tool 18 in system 2 to determine a candidate's qualifications for job titles is described with reference to Tables 1-3, infra. The implementation example illustrates a candidate attempting to move from a first job title (Data Architect) to a second job title (Network Architect).

Table 1 illustrates job related skills associated with a Data Architect job title currently held by the candidate (i.e., an example of candidate input data 22).

TABLE 1

| Job Title | Possessed Job related Skills |
|---|---|
| Data Architect | Communication |
| | Apply IT standards |
| | Use of consulting techniques |
| | Develop IT standards |
| | Develop solutions architecture |
| | Use of existing work products |
| | Develop test strategies |
| | Lead in setting technical direction |
| | Use of modeling techniques |
| | Perform technical solution assessments |

The first column comprises a Data Architect job title. The second column comprises a list of job related skills associated with a Data Architect job title currently held by the candidate.

Table 2 illustrates job related skills required to obtain a Network Architect job title (i.e., an example of job related data 16).

TABLE 2

| Job Title | Required Job related Skills |
| --- | --- |
| Network Architect | Communication |
| | Apply IT standards |
| | Apply methodologies |
| | Develop IT standards |
| | Develop solutions architecture |
| | Manage client relationships |
| | Develop test strategies |
| | Lead in setting technical direction |
| | Design physical data model |
| | Perform technical solution assessments |

The first column comprises a Network Architect job title. The second column comprises a list of job related skills required to obtain a Network Architect job title. Note that column 2, rows 3, 6, and 9 (emphasis added) each comprise a required job skill for the Network architect title that is not associated with the current job (i.e., Data Architect) possessed by the candidate represented in Table 1.

Table 3 illustrates job related skills required to obtain a Network Architect job title as compared to job related skills associated with a Data Architect job title currently held by the candidate (i.e., common skills between Network Architect job title and Data Architect job title) applying for the Network Architect job title and currently holding a Data Architect job title. Additionally, Table 3 illustrates which of the job related skills required to obtain a Network Architect job title comprise market valued skills. This comparison between skills and determination of market valued skills is performed by career analysis tool 18.

TABLE 3

| Job Title | Required Job related Skills | Matching/ Common Skills | Market valued skills |
| --- | --- | --- | --- |
| Network Architect | Communication | Yes | Yes |
| | Apply IT standards | Yes | Yes |
| | Apply methodologies | No | Yes |
| | Develop IT standards | Yes | Yes |
| | Develop solutions architecture | Yes | No |
| | Manage client relationships | No | No |
| | Develop test strategies | Yes | Yes |
| | Lead in setting technical direction | Yes | Yes |
| | Design physical data model | No | No |
| | Perform technical solution assessments | Yes | No |

The first column comprises a Network Architect job title. The second column comprises a list of job related skills required to obtain a Network Architect job title. The third column comprises common skills (i.e., represented by a Yes) between Network Architect job title (i.e., required skills) and Data Architect job title (i.e., current job title held by candidate). This example comprises 7 common skills. The fourth column comprises required skills to obtain a Network Architect job title that comprise market valued skills (i.e., represented by a Yes). Each of the required skills may be analyzed individually by career analysis tool 18 to determine whether or not they comprise a market valued skill. Market valued skills are determined using external and internal market related data to determine and update which job related skills comprise market valued skills as described, supra. External market related data which identifies market valued skills may comprise any market related data known to a person of ordinary skill in the art including, inter alia, the Foote report, the Gartner group report, internet market data sources, etc as described, supra. Based on a number of market valued skills determined (6 in this example), a weighting factor (i.e., based on a number of market valued skills divided by a total number of required skills) may be assigned to the job skills comparison. Therefore, career analysis tool 18 determines common skills between the two job titles (i.e., Data Architect job title and Network Architect job title) and which required job skills for the Network Architect job title that the entity or business should consider in demand skills in the market place (i.e., market valued skills). Career analysis tool 18 may calculate an analysis score to determine if a candidate is a good match for a job (e.g., if the candidate holding the Data Architect job title is a good candidate for the Network Architect job title). The analysis score is based on the weighting factor assigned to the job skills comparison (i.e., common skills) using the following Equation 1.

$$\text{Analysis score} = \text{Common skills} * 1/\text{Total required skills} + \text{Weighting factor} \quad \text{Equation 1}$$

The weighting factor is calculated by dividing a number of market valued skills by a total number of required skills. Therefore, based on data from Tables 1-3, career analysis tool 18 determines that:

Common skills=7

Total required skills=10 and therefore 1/Total required skills=$1/10$ or 0.10

Weighting factor=Market valued skills/Total required skills=$6/10$ or 0.6.

Therefore, using Equation 1, an analysis score may be calculated (i.e., by career analysis tool 18) as follows:

Analysis score=Common skills*1/Total required skills+Weighting factor

Analysis score=$7 * 1/10 + 6/10$

Analysis score=1.3

Equation 1 will calculate analysis scores comprising a range of 0 to 2 with 0 indicating that the candidate is not a match for a specific job and 2 indicating that the candidate is a perfect match for a specific job. The analysis score is compared to a predetermined value to determine an action performed for the candidate (e.g., recommend that the candidate is a match for a specific job, reject a candidate for a specific job, recommend a training program to prepare the candidate for a specific job). For example, any analysis score comprising a range of greater than or equal to 1 (i.e., 1 is the predetermined value) is considered to be a good match for a specific job because the candidate is determined to possess an adequate number of required skills and therefore any training time required to move from a current job position to a desired job position would be minimal. Any analysis score comprising a range of less than or equal to 1 (i.e., 1 is the predetermined value) is not considered to be a good match for a specific job because the candidate is not determined to possess an adequate number of required skills. However, if there is no time limitation related to training time then candidates comprising an analysis score of less than 1 may be considered as long as required skills are determined to be considered market valued skills. Therefore, based of the implementation example with respect to Tables 1-3, the candidate was determined to have an analysis score of 1.3 (i.e., greater than or equal to 1) and therefore the candidate is considered to be a good match for the Network Architect job. Additionally, prior to calculating the analysis score, a first fraction of common skills scores between the two job titles (i.e., Common skills*1/Total required skills from Equation 1) may be compared to a first predetermined value and a second fraction of market valued skills with respect to a total number of required skills for the requested job title (i.e., Weighting factor from Equation 1) may be compared to a second predetermined value. In this instance, the first predetermined value would have to be equal to or exceeded by the first fraction and the second predetermined value would have to be equal to or exceeded by the second fraction in order to calculate an analysis score. If the first predetermined value is not equal to or exceeded by the first fraction and/or the second predetermined value is not equal to or exceeded by the second fraction, then an analysis score is not calculated due to a possibility of calculating an inaccurate analysis score. For example, if not enough common skills exist but a large number of market valued skills exist, the candidate may obtain an acceptable analysis score without possessing enough common skills. Therefore, the first predetermined value is not exceeded by the first fraction but the second predetermined value is not exceeded by the second fraction so, it is not necessary to calculate the analysis score because not enough common skills exist to provide an accurate analysis score. Additionally, each of the market valued skills and each of the common skills may be weighted (i.e., a weighting factor applied) before an analysis score is calculated. As a first example, each of the common skills may be weighted according to a relative importance (e.g., by an expert in the field) to the requested job (e.g., for a Network Architect it may be determined that an Apply IT standards skill is more important that a communications skill and therefore the Apply IT standards skill is weighted higher). As a second example, each of the market valued skills may be weighted according to an amount of time that the market valued skill has been determined to be a market valued skill (e.g., the greater the amount of time that the market valued skill has been determined to be a market valued skill, the higher the weighting).

Career analysis tool 18 may be used for (and the implementation example with respect to Tables 1-3 may be applied to) calculating several analysis scores for a candidate for several job titles and specific job titles may be recommended by career analysis tool 18 based on a comparison of each the analysis scores to each other. Additionally, career analysis tool 18 may determine a skills delta between job related skills associated with a job held by the candidate and required skills necessary to obtain a desired position (i.e., required skills missing from the candidate's current job). Career analysis tool 18 may determine a training program for the candidate for obtaining the missing required skills determined by the skills delta. For example, with respect to the implementation example with respect to Tables 1-3, the candidate would be determined to have a skills delta of 3 (i.e., 3 missing required skills as indicated by "No" in Column 3, rows 3, 6, and 9 of Table 3). Career analysis tool 18 may develop a training program for the candidate so that the candidate could acquire the 3 missing required skills.

Figure 2:
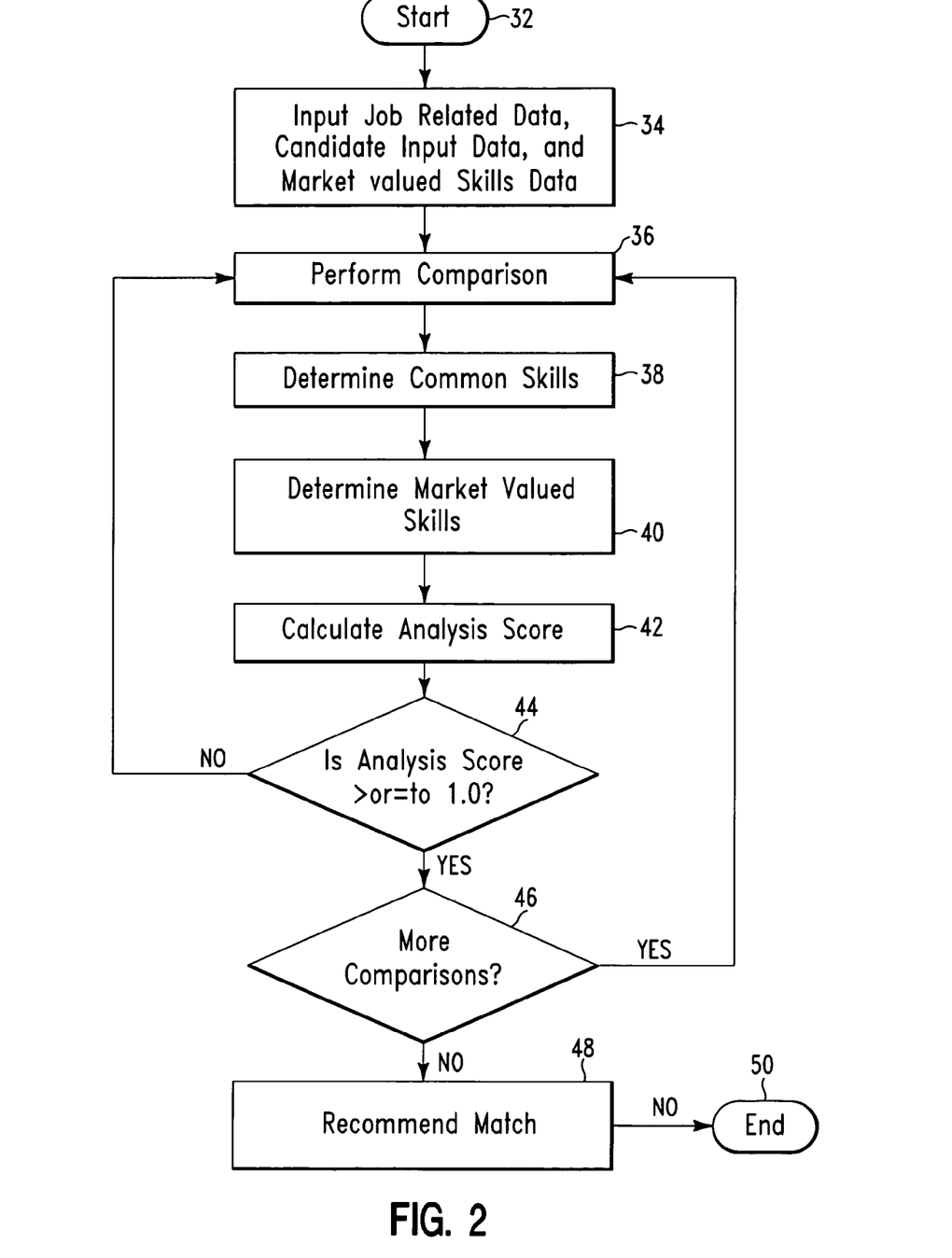
FIG. 2 illustrates a flowchart describing an algorithm for an analysis process used by career analysis tool in system of FIG. 1, in accordance with embodiments of the present invention.

FIG. 2 illustrates a flowchart describing an algorithm for a analysis process used by career analysis tool 18 in system 2 of FIG. 1, in accordance with embodiments of the present invention. In step 32, the process is initiated. In step 34, job related data 16, candidate input data 22, and market valued skills data 25 are inputted into system 2. In step 36, a comparison is performed between required skills for a job title held by a candidate and required skills necessary for a desired job title (i.e., position). In step 38, common skills are determined between required skills for a job title held by a candidate and required skills necessary for a desired job title. Additionally, as described supra in the description of FIG. 1, the common skills may be weighted or compared to a predetermined value. In step 40, market valued skills are determined for the required skills based on market valued skills data 25. Additionally, as described supra in the description of FIG. 1, the market valued skills may be weighted or compared to a predetermined value. In step 42, an analysis score is calculated using Equation 1 (see description of FIG. 1, supra). In step 44, it is determined if the analysis score is greater than or equal to 1.0. If in step 44 it is determined that the analysis score is not greater than or equal to 1.0 (i.e., less than 1.0), then step 36 is repeated to perform another comparison between job related skills for a job title held by a candidate and required skills necessary for another desired job title. If in step 44 it is determined that the analysis score is greater than or equal to 1.0, then in step 46 it is determined if more comparisons are necessary to determine additional job matches for the candidate. If in step 46 it is determined that more comparisons are necessary to determine additional job matches for the candidate, then step 36 is repeated to determine additional job matches for the candidate. If in step 46 it is determined that more comparisons are not necessary to determine additional job matches for the candidate, then in step 48 a job title is recommended for the candidate and the process is terminated in step 50.

Figure 3:
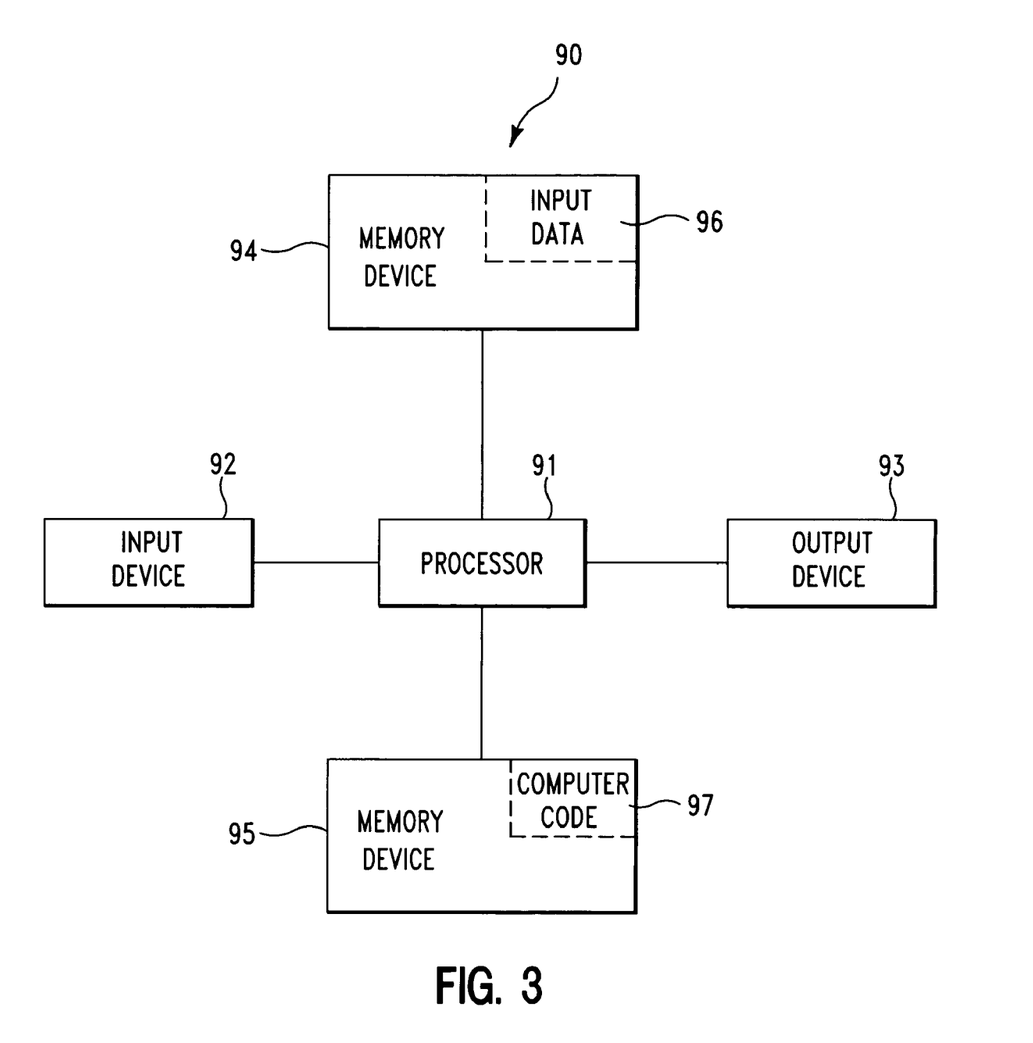
FIG. 3 illustrates a computer system used for determining suitable jobs for various candidates based on data related to job skills, in accordance with embodiments of the present invention

FIG. 3 illustrates a computer system 90 used for determining suitable jobs for various candidates based on data related to job skills, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., a monitor), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for determining suitable jobs for various candidates based on data related to job skills. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for determining suitable jobs for various candidates based on data related to job skills.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:

providing a computing apparatus comprising a memory device, said memory device comprising a career analysis tool and job related data, said job related data comprising a first specified job title and a first list comprising a first plurality of required skills for said first specified job title, said job related data further comprising a plurality of additional job titles;

receiving by said computing apparatus, job candidate data, said job candidate data comprising a job candidate and a second list comprising a second plurality of required skills related to a current job held by said job candidate, wherein said current job held by said candidate differs from a job associated with said specified job title;

receiving, by said computing apparatus, first job market data, wherein said first job market data comprises first internal market data and first external market data, wherein said first internal market data comprises first capacity planning data associated with an entity and first workforce management data associated with said entity, and wherein said entity is associated with said first specified job title;

storing within said memory device, said job candidate data and said first job market data;

comparing, by said career analysis tool, said first plurality of required skills with said second plurality of required skills to determine a first set of common skills between said first plurality of required skills and said second plurality of skills;

applying, by said career analysis tool, a first set of weighting factors to said first set of common skills, wherein each weighting factor of said first set of weighting factors is applied to an associated common skill of said first set of common skills based on a predetermined relative importance for each said associated common skill with respect to said first specified job title;

calculating, by said career analysis tool, a first score for said candidate by dividing the number of said first set of common skills by the number of said first plurality of required skills;

comparing by said career analysis tool, said first job market data with said first plurality of required skills to determine a first set of market valued skills from said first plurality of required skills, wherein said first set of market valued skills indicate a first group of critical market place skills required to perform a specified job associated with said first specified job title, wherein said first group of critical market place skills are linked with first business unit skills associated with achieving first business priorities comprising growth in revenue and innovation, and wherein said first group of critical market place skills are aligned with a first specified market direction and a first specified business strategy for said entity;

reviewing, by said career analysis tool after a specified time period, said first set of market valued skills;

determining, by said career analysis tool based on results of said reviewing said first set of market valued skills, that said first set of market valued skills are outdated;

receiving, by said computing apparatus in response to said determining that said first set of market valued skills are outdated, second updated job market data, wherein said second job market data comprises second internal market data and second external market data, and wherein said second internal market data comprises second capacity planning data associated with said entity and second workforce management data associated with said entity;

storing within said memory device, said second updated job market data;

comparing by said career analysis tool, said second updated job market data with said first plurality of required skills to determine a second set of market valued skills from said first plurality of required skills wherein said second set of market valued skills differ from said first set of market valued skills, wherein said second set of market valued skills indicate a second group of critical market place skills required to perform said specified job associated with said first specified job title, wherein said second group of critical market place skills are linked with second business unit skills associated with achieving second business priorities comprising growth in revenue and innovation, and wherein said second group of critical market place skills are aligned with a second specified market direction and a second specified business strategy for said entity;

applying, by said career analysis tool, a second set of weighting factors to said second set of market valued skills, wherein each weighting factor of said second set of weighting factors is applied to an associated market valued skill of said second set of market valued skills based on a an amount of time that each said associated market valued skill has been determined to be a market valued skill;

calculating by said career analysis tool, a second score for said job candidate by dividing the number of said second set of market valued skills by the number of said first plurality of required skills;

comparing by said career analysis tool, said first score to a first numerical value;

comparing by said career analysis tool, said second score to a second numerical value;

comparing by said career analysis tool, said first plurality of required skills with said second plurality of required skills to determine a set of required skills of said second plurality of required skills that are not comprised by said first plurality of required skills;

generating by said career analysis tool, a training program for said job candidate to obtain training associated with said set of required skills;

determining by said career analysis tool, results of said comparing said first score to said first numerical value and said comparing said second score to said second numerical value;

determining by said career analysis tool based on said results, that a first analysis score for said job candidate in relation to said first specified job title will be calculated;

calculating by said career analysis tool, said first analysis score, wherein said calculating said first analysis score comprises adding said first score to said second score;

comparing said first analysis score to a first predetermined value; and performing an action for said job candidate based on results of said comparing said first analysis score to said first predetermined value.

2. The method of claim 1, further comprising:

determining that said comparing results in said first analysis score exceeding said first predetermined value, wherein said performing said action comprises recommending said first specified job title to said job candidate.

3. The method of claim 1, further comprising:

determining that said comparing results in said first analysis score being less than said first predetermined value, wherein said performing said action comprises rejecting said first specified job title for said job candidate.

4. The method of claim 1, further comprising:

comparing by said career analysis tool, said first score to a predetermined value;

determining that said comparing said first score to said predetermined value results in said first score exceeding said predetermined value;

comparing by said career analysis tool, said second score to a second predetermined value;

determining that said comparing said second score to said second predetermined value results in said second score exceeding said second predetermined value;

comparing said first analysis score to a third predetermined value; and performing an action for said job candidate based on said comparing said first analysis score to a third predetermined value.

5. The method of claim 4, further comprising:

determining that said comparing said first analysis score to said third predetermined value results in said first analysis score exceeding said third predetermined value, wherein said performing said action comprises recommending said first specified job title to said job candidate.

6. The method of claim 4, further comprising:

determining that said comparing said first analysis score to said third predetermined value results in said first analysis score being less than said third predetermined value, wherein said performing said action comprises rejecting said first specified job title for said job candidate.

7. The method of claim 1, wherein said job related data further comprises a second specified job title and a third list comprising a third plurality of required skills for said second specified job title, and wherein said method further comprises:

comparing by said career analysis tool, said second plurality of required skills with said third plurality of required skills to determine a second set of common skills between said second plurality of required skills and said third plurality of required skills;

calculating, by said career analysis tool, a third score for said candidate by dividing the number of said second set of common skills by the number of said third plurality of required skills;

comparing by said career analysis tool, said job market data with said third plurality of required skills to determine a second set of market valued skills from said third plurality of required skills; and calculating by said career analysis tool, a fourth score for said job candidate by dividing the number of said second set of market valued skills by the number of said third plurality of required skills.

8. The method of claim 7, further comprising:

determining that said comparing said first analysis score to said first predetermined value results in said first analysis score exceeding said first predetermined value;

calculating by said career analysis tool, a second analysis score for said job candidate in relation to said second specified job title, wherein said second analysis score is based on a function of said third score and said fourth score;

comparing said second analysis score to a second predetermined value;

determining that said comparing said second analysis score to said second predetermined value results in said second analysis score exceeding said second predetermined value;

comparing said first analysis score to said second analysis score; and performing an action for said job candidate based on said comparing said first analysis score to said second analysis score.

9. The method of claim 8, further comprising:

determining that said comparing said first analysis score to said second analysis score results in said first analysis score exceeding said second analysis score, wherein said performing said action comprises recommending said first specified job title to said job candidate.

10. The method of claim 8, further comprising:

determining that said comparing said first analysis score to said second analysis score results in said first analysis score being less than said second analysis score, wherein said performing said action comprises recommending said second specified job title to said job candidate.

11. A computing system comprising a processor coupled to a computer-readable memory unit, said memory unit comprising a career analysis tool and job related data, said job related data comprising a first specified job title and a first list comprising a first plurality of required skills for said first specified job title, said job related data further comprising a plurality of additional job titles, said career analysis tool comprising instructions that when executed by the processor implement an analysis method, said method comprising:

receiving by said computing system, job candidate data, said job candidate data comprising a job candidate and a second list comprising a second plurality of required skills related to a current job held by said job candidate, wherein said current job held by said candidate differs from a job associated with said specified job title;

receiving, by said computing system, first job market data, wherein said first job market data comprises first internal market data and first external market data, wherein said first internal market data comprises first capacity planning data associated with an entity and first workforce management data associated with said entity, and wherein said entity is associated with said first specified job title;

storing within said computer-readable memory unit, said job candidate data and said first job market data;

comparing by said career analysis tool, said first plurality of required skills with said second plurality of required skills to determine a first set of common skills between said first plurality of required skills and said second plurality of skills;

applying, by said career analysis tool, a first set of weighting factors to said first set of common skills, wherein each weighting factor of said first set of weighting factors is applied to an associated common skill of said first set of common skills based on a predetermined relative importance for each said associated common skill with respect to said first specified job title;

calculating, by said career analysis tool, a first score for said candidate by dividing the number of said first set of common skills by the number of said first plurality of required skills;

comparing by said career analysis tool, said first job market data with said first plurality of required skills to determine a first set of market valued skills from said first plurality of required skills, wherein said first set of market valued skills indicate a first group of critical market place skills required to perform a specified job associated with said first specified job title, wherein said first group of critical market place skills are linked with first business unit skills associated with achieving first business priorities comprising growth in revenue and innovation, and wherein said first group of critical market place skills are aligned with a first specified market direction and a first specified business strategy for said entity;

reviewing, by said career analysis tool after a specified time period, said first set of market valued skills;

determining, by said career analysis tool based on results of said reviewing said first set of market valued skills, that said first set of market valued skills are outdated;

receiving, by said computing system in response to said determining that said first set of market valued skills are outdated, second updated job market data, wherein said second job market data comprises second internal market data and second external market data, and wherein said second internal market data comprises second capacity planning data associated with said entity and second workforce management data associated with said entity;

storing within said computer-readable memory unit, said second updated job market data;

comparing by said career analysis tool, said second updated job market data with said first plurality of required skills to determine a second set of market valued skills from said first plurality of required skills, wherein said second set of market valued skills differ from said first set of market valued skills, wherein said second set of market valued skills indicate a second group of critical market place skills required to perform said specified job associated with said first specified job title, wherein said second group of critical market place skills are linked with second business unit skills associated with achieving second business priorities comprising growth in revenue and innovation, and wherein said second group of critical market place skills are aligned with a second specified market direction and a second specified business strategy for said entity;

applying, by said career analysis tool, a second set of weighting factors to said second set of market valued skills, wherein each weighting factor of said second set of weighting factors is applied to an associated market valued skill of said second set of market valued skills based on a an amount of time that each said associated market valued skill has been determined to be a market valued skill;

calculating by said career analysis tool, a second score for said job candidate by dividing the number of said second set of market valued skills by the number of said first plurality of required skills;

comparing by said career analysis tool, said first score to a first numerical value;

comparing by said career analysis tool, said second score to a second numerical value;

comparing by said career analysis tool, said first plurality of required skills with said second plurality of required skills to determine a set of required skills of said second plurality of required skills that are not comprised by said first plurality of required skills;

generating by said career analysis tool, a training program for said job candidate to obtain training associated with said set of required skills;

determining by said career analysis tool, results of said comparing said first score to said first numerical value and said comparing said second score to said second numerical value;

determining by said career analysis tool based on said results, that a first analysis score for said job candidate in relation to said first specified job title will be calculated;

calculating by said career analysis tool, said first analysis score, wherein said calculating said first analysis score comprises adding said first score to said second score;

comparing said first analysis score to a first predetermined value; and performing an action for said job candidate based on results of said comparing said first analysis score to said first predetermined value.

12. The computing system of claim 11, wherein said method further comprises:

determining that said comparing results in said first analysis score exceeding said first predetermined value, wherein said performing said action comprises recommending said first specified job title to said job candidate.

13. The computing system of claim 11, wherein said method further comprises:

determining that said comparing results in said first analysis score being less than said first predetermined value, wherein said performing said action comprises rejecting said first specified job title for said job candidate.

14. The computing system of claim 11, wherein said method further comprises:

comparing by said career analysis tool, said first score to a predetermined value;

determining that said comparing said first score to said predetermined value results in said first score exceeding said predetermined value;

comparing by said career analysis tool, said second score to a second predetermined value;

determining that said comparing said second score to said second predetermined value results in said second score exceeding said second predetermined value;

comparing said first analysis score to a third predetermined value; and performing an action for said job candidate based on said comparing said first analysis score to a third predetermined value.

15. The computing system of claim 14, wherein said method further comprises:

determining that said comparing said first analysis score to said third predetermined value results in said first analysis score exceeding said third predetermined value, wherein said performing said action comprises recommending said first specified job title to said job candidate.

16. The computing system of claim 14, wherein said method further comprises:
   determining that said comparing said first analysis score to said third predetermined value results in said first analysis score being less than said third predetermined value, wherein said performing said action comprises rejecting said first specified job title for said job candidate.

17. The computing system of claim 11, wherein said job related data further comprises a second specified job title and a third list comprising a second plurality of required skills for said second specified job title, and wherein said method further comprises:
   comparing by said career analysis tool, said second plurality of required skills to said plurality of skills possessed by said job candidate to determine a second set of common skills between said second plurality of required skills and said plurality of skills possessed by said job candidate;
   determining by said career analysis tool, a second set of market valued skills associated with a second set of required skills from said second plurality of required skills;
   analyzing by said career analysis tool, said job candidate for said second specified job title based on a function of said second set of common skills and said second set of market valued skills.

18. The computing system of claim 17, wherein said method further comprises:
   determining that said comparing said first analysis score to said first predetermined value results in said first analysis score exceeding said first predetermined value;
   calculating by said career analysis tool, a second analysis score for said job candidate in relation to said second specified job title, wherein said second analysis score is based on a function of said third score and said fourth score;
   comparing said second analysis score to a second predetermined value;
   determining that said comparing said second analysis score to said second predetermined value results in said second analysis score exceeding said second predetermined value;
   comparing said first analysis score to said second analysis score; and
   performing an action for said job candidate based on said comparing said first analysis score to said second analysis score.

19. The computing system of claim 18, wherein said method further comprises:
   determining that said comparing said first analysis score to said second analysis score results in said first analysis score exceeding said second analysis score, wherein said performing said action comprises recommending said first specified job title to said job candidate.

20. The computing system of claim 18, wherein said method further comprises:
   determining that said comparing said first analysis score to said second analysis score results in said first analysis score being less than said second analysis score, wherein said performing said action comprises recommending said second specified job title to said job candidate.

21. A computer program product, comprising a computer readable medium comprising job related data and a computer readable program code embodied therein, said job related data comprising a first specified job title and a first list comprising a first plurality of required skills for said first specified job title, said job related data further comprising a plurality of additional job titles, said computer readable program code comprising a career analysis tool adapted to implement an analysis method, said method comprising:
   receiving job candidate data, said job candidate data comprising a current job held by said job candidate, wherein said current job held by said candidate differs from a job associated with said specified job title;
   receiving first job market data, wherein said first job market data comprises first internal market data and first external market data, wherein said first internal market data comprises first capacity planning data associated with an entity and first workforce management data associated with said entity, and wherein said entity is associated with said first specified job title;
   storing within said computer readable medium, said job candidate data and said first job market data;
   comparing by said career analysis tool, said first plurality of required skills with said second plurality of required skills to determine a first set of common skills between said first plurality of required skills and said second plurality of skills;
   applying, by said career analysis tool, a first set of weighting factors to said first set of common skills, wherein each weighting factor of said first set of weighting factors is applied to an associated common skill of said first set of common skills based on a predetermined relative importance for each said associated common skill with respect to said first specified job title;
   calculating, by said career analysis tool, a first score for said candidate by dividing the number of said first set of common skills by the number of said first plurality of required skills;
   comparing by said career analysis tool, said first job market data with said first plurality of required skills to determine a first set of market valued skills from said first plurality of required skills, wherein said first set of market valued skills indicate a first group of critical market place skills required to perform a specified job associated with said first specified job title, wherein said first group of critical market place skills are linked with first business unit skills associated with achieving first business priorities comprising growth in revenue and innovation, and wherein said first group of critical market place skills are aligned with a first specified market direction and a first specified business strategy for said entity;
   reviewing, by said career analysis tool after a specified time period, said first set of market valued skills;
   determining, by said career analysis tool based on results of said reviewing said first set of market valued skills, that said first set of market valued skills are outdated;
   receiving, in response to said determining that said first set of market valued skills are outdated, second updated job market data, wherein said second job market data comprises second internal market data and second external market data, and wherein said second internal market data comprises second capacity planning data associated with said entity and second workforce management data associated with said entity;
   storing within said computer readable medium, said second updated job market data;
   comparing by said career analysis tool, said second updated job market data with said first plurality of required skills to determine a second set of market valued skills from said first plurality of required skills, wherein said second set of market valued skills differ from said first set of market valued skills, wherein said second set of market valued skills indicate a second group of critical market place skills required to perform said specified job associated with said first specified job title, wherein said second group of critical market place skills are linked with second business unit skills associated with achieving second business priorities comprising growth in revenue and innovation, and wherein said second group of critical market place skills are aligned with a second specified market direction and a second specified business strategy for said entity;

applying, by said career analysis tool, a second set of weighting factors to said second set of market valued skills, wherein each weighting factor of said second set of weighting factors is applied to an associated market valued skill of said second set of market valued skills based on a an amount of time that each said associated market valued skill has been determined to be a market valued skill;

calculating by said career analysis tool, a second score for said job candidate by dividing the number of said second set of market valued skills by the number of said first plurality of required skills;

comparing by said career analysis tool, said first score to a first numerical value;

comparing by said career analysis tool, said second score to a second numerical value;

comparing by said career analysis tool, said first plurality of required skills with said second plurality of required skills to determine a set of required skills of said second plurality of required skills that are not comprised by said first plurality of required skills;

generating by said career analysis tool, a training program for said job candidate to obtain training associated with said set of required skills;

determining by said career analysis tool, results of said comparing said first score to said first numerical value and said comparing said second score to said second numerical value;

determining by said career analysis tool based on said results, that a first analysis score for said job candidate in relation to said first specified job title will be calculated;

calculating by said career analysis tool, said first analysis score, wherein said calculating said first analysis score comprises adding said first score to said second score;

comparing said first analysis score to a first predetermined value; and performing an action for said job candidate based on results of said comparing said first analysis score to said first predetermined value.

22. The computer program product of claim 21, wherein said method further comprises:
determining that said comparing results in said first analysis score exceeding said first predetermined value, wherein said performing said action comprises recommending said first specified job title to said job candidate.

23. The computer program product of claim 21, wherein said method further comprises:
determining that said comparing results in said first analysis score being less than said first predetermined value, wherein said performing said action comprises rejecting said first specified job title for said job candidate.

24. The computer program product of claim 21, wherein said method further comprises:

comparing by said career analysis tool, said first score to a predetermined value;

determining that said comparing said first score to said predetermined value results in said first score exceeding said predetermined value;

comparing by said career analysis tool, said second score to a second predetermined value;

determining that said comparing said second score to said second predetermined value results in said second score exceeding said second predetermined value;

comparing said first analysis score to a third predetermined value; and performing an action for said job candidate based on said comparing said first analysis score to a third predetermined value.

25. The computer program product of claim 24, wherein said method further comprises:
determining that said comparing said first analysis score to said third predetermined value results in said first analysis score exceeding said third predetermined value, wherein said performing said action comprises recommending said first specified job title to said job candidate.

26. The computer program product of claim 24, wherein said method further comprises:
determining that said comparing said first analysis score to said third predetermined value results in said first analysis score being less than said third predetermined value, wherein said performing said action comprises rejecting said first specified job title for said job candidate.

27. The computer program product of claim 21, wherein said job related data further comprises a second specified job title and a third list comprising a second plurality of required skills for said second specified job title, and wherein said method further comprises:
comparing by said career analysis tool, said second plurality of required skills to said plurality of skills possessed by said job candidate to determine a second set of common skills between said second plurality of required skills and said plurality of skills possessed by said job candidate;

determining by said career analysis tool, a second set of market valued skills associated with a second set of required skills from said second plurality of required skills;

analyzing by said career analysis tool, said job candidate for said second specified job title based on a function of said second set of common skills and said second set of market valued skills.

28. The computer program product of claim 27, wherein said method further comprises:
determining that said comparing said first analysis score to said first predetermined value results in said first analysis score exceeding said first predetermined value;

calculating by said career analysis tool, a second analysis score for said job candidate in relation to said second specified job title, wherein said second analysis score is based on a function of said third score and said fourth score;

comparing said second analysis score to a second predetermined value;

determining that said comparing said second analysis score to said second predetermined value results in said second analysis score exceeding said second predetermined value;

comparing said first analysis score to said second analysis score; and performing an action for said job candidate based on said comparing said first analysis score to said second analysis score.

29. The computer program product of claim 28, wherein said method further comprises:
    determining that said comparing said first analysis score to said second analysis score results in said first analysis score exceeding said second analysis score, wherein said performing said action comprises recommending said first specified job title to said job candidate.

30. The computer program product of claim 28, wherein said method further comprises:
    determining that said comparing said first analysis score to said second analysis score results in said first analysis score being less than said second analysis score, wherein said performing said action comprises recommending said second specified job title to said job candidate.

31. A process for integrating computing infrastructure, comprising integrating computer-readable code into a computer system, wherein the computer system comprises a computer readable medium, wherein said computer usable medium comprises job related data, wherein said job related data comprises a first specified job title and a first list comprising a first plurality of required skills for said first specified job title, wherein said job related data further comprising a plurality of additional job titles, and wherein the code in combination with the computer system is capable of performing a method comprising:
    receiving by said computing system, job candidate data, said job candidate data comprising a job candidate and a second list comprising a second plurality of required skills related to a current job held by said job candidate, wherein said current job held by said candidate differs from a job associated with said specified job title;
    receiving, by said computing system, first job market data, wherein said first job market data comprises first internal market data and first external market data, wherein said first internal market data comprises first capacity planning data associated with an entity and first workforce management data associated with said entity, and wherein said entity is associated with said first specified job title;
    storing within said computer readable medium, said job candidate data and said first job market data;
    comparing, said first plurality of required skills with said second plurality of required skills to determine a first set of common skills between said first plurality of required skills and said second plurality of skills;
    applying, by said career analysis tool, a first set of weighting factors to said first set of common skills, wherein each weighting factor of said first set of weighting factors is applied to an associated common skill of said first set of common skills based on a predetermined relative importance for each said associated common skill with respect to said first specified job title;
    calculating, by said career analysis tool, a first score for said candidate by dividing the number of said first set of common skills by the number of said first plurality of required skills;
    comparing by said career analysis tool, said first job market data with said first plurality of required skills to determine a first set of market valued skills from said first plurality of required skills, wherein said first set of market valued skills indicate a first group of critical market place skills required to perform a specified job associated with said first specified job title, wherein said first group of critical market place skills are linked with first business unit skills associated with achieving first business priorities comprising growth in revenue and innovation, and wherein said first group of critical market place skills are aligned with a first specified market direction and a first specified business strategy for said entity;
    reviewing, by said career analysis tool after a specified time period, said first set of market valued skills;
    determining, by said career analysis tool based on results of said reviewing said first set of market valued skills, that said first set of market valued skills are outdated;
    receiving, by said computing system in response to said determining that said first set of market valued skills are outdated, second updated job market data, wherein said second, job market data comprises second internal market data and second external market data, and wherein said second internal market data comprises second capacity planning data associated with said entity and second workforce management data associated with said entity;
    storing within said computer readable medium, said second updated job market data;
    comparing by said career analysis tool, said second updated job market data with said first plurality of required skills to determine a second set of market valued skills from said first plurality of required skills, wherein said second set of market valued skills differ from said first set of market valued skills, wherein said second set of market valued skills indicate a second group of critical market place skills required to perform said specified job associated with said first specified job title, wherein said second group of critical market place skills are linked with second business unit skills associated with achieving second business priorities comprising growth in revenue and innovation, and wherein said second group of critical market place skills are aligned with a second specified market direction and a second specified business strategy for said entity;
    applying, by said career analysis tool, a second set of weighting factors to said second set of market valued skills, wherein each weighting factor of said second set of weighting factors is applied to an associated market valued skill of said second set of market valued skills based on a an amount of time that each said associated market valued skill has been determined to be a market valued skill;
    calculating by said career analysis tool, a second score for said job candidate by dividing the number of said second set of market valued skills by the number of said first plurality of required skills;
    comparing by said career analysis tool, said first score to a first numerical value;
    comparing by said career analysis tool, said second score to a second numerical value;
    comparing by said career analysis tool, said first plurality of required skills with said second plurality of required skills to determine a set of required skills of said second plurality of required skills that are not comprised by said first plurality of required skills;
    generating by said career analysis tool, a training program for said job candidate to obtain training associated with said set of required skills;
    determining by said career analysis tool, results of said comparing said first score to said first numerical value and said comparing said second score to said second numerical value;

determining by said career analysis tool based on said results, that a first analysis score for said job candidate in relation to said first specified job title will be calculated;

calculating by said career analysis tool, said first analysis score, wherein said calculating said first analysis score comprises adding said first score to said second score;

comparing said first analysis score to a first predetermined value; and performing an action for said job candidate based on results of said comparing said first analysis score to said first predetermined value.

32. The process of claim 31, wherein said method further comprises:

determining that said comparing results in said first analysis score exceeding said first predetermined value, wherein said performing said action comprises recommending said first specified job title to said job candidate.

33. The process of claim 31, wherein said method further comprises:

determining that said comparing results in said first analysis score being less than said first predetermined value, wherein said performing said action comprises rejecting said first specified job title for said job candidate.

34. The process of claim 31, wherein said method further comprises:

comparing by said career analysis tool, said first score to a predetermined value;

determining that said comparing said first score to said predetermined value results in said first score exceeding said predetermined value;

comparing by said career analysis tool, said second score to a second predetermined value;

determining that said comparing said second score to said second predetermined value results in said second score exceeding said second predetermined value;

comparing said first analysis score to a third predetermined value; and performing an action for said job candidate based on said comparing said first analysis score to a third predetermined value.

35. The process of claim 34, wherein said method further comprises:

determining that said comparing said first analysis score to said third predetermined value results in said first analysis score exceeding said third predetermined value, wherein said performing said action comprises recommending said first specified job title to said job candidate.

36. The process of claim 34, wherein said method further comprises:

determining that said comparing said first analysis score to said third predetermined value results in said first analysis score being less than said third predetermined value, wherein said performing said action comprises rejecting said first specified job title for said job candidate.

37. The process of claim 31, wherein said job related data further comprises a second specified job title and a third list comprising a second plurality of required skills for said second specified job title, and wherein said method further comprises:

comparing said second plurality of required skills to said plurality of skills possessed by said job candidate to determine a second set of common skills between said second plurality of required skills and said plurality of skills possessed by said job candidate;

determining a second set of market valued skills associated with a second set of required skills from said second plurality of required skills;

analyzing said job candidate for said second specified job title based on a function of said second set of common skills and said second set of market valued skills.

38. The process of claim 37, wherein said method further comprises:

determining that said comparing said first analysis score to said first predetermined value results in said first analysis score exceeding said first predetermined value;

calculating by said career analysis tool, a second analysis score for said job candidate in relation to said second specified job title, wherein said second analysis score is based on a function of said third score and said fourth score;

comparing said second analysis score to a second predetermined value;

determining that said comparing said second analysis score to said second predetermined value results in said second analysis score exceeding said second predetermined value;

comparing said first analysis score to said second analysis score; and performing an action for said job candidate based on said comparing said first analysis score to said second analysis score.

39. The process of claim 38, wherein said method further comprises:

determining that said comparing said first analysis score to said second analysis score results in said first analysis score exceeding said second analysis score, wherein said performing said action comprises recommending said first specified job title to said job candidate.

40. The process of claim 38, wherein said method further comprises:

determining that said comparing said first analysis score to said second analysis score results in said first analysis score being less than said second analysis score, wherein said performing said action comprises recommending said second specified job title to said job candidate.

* * * * *